United States Patent
Toombs et al.

(10) Patent No.: US 6,901,457 B1
(45) Date of Patent: May 31, 2005

(54) MULTIPLE MODE COMMUNICATIONS SYSTEM

(75) Inventors: Thomas N. Toombs, Los Gatos, CA (US); Micky Holtzman, Kfar Vradim (IL)

(73) Assignee: SanDisk Corporation, Sunnyvale, CA (US)

( * ) Notice: Subject to any disclaimer, the term of this patent is extended or adjusted under 35 U.S.C. 154(b) by 0 days.

(21) Appl. No.: 09/186,064

(22) Filed: Nov. 4, 1998

(51) Int. Cl.⁷ .............................................. G06F 3/00
(52) U.S. Cl. .................................... 710/11; 710/301
(58) Field of Search .................. 710/10–11, 104–105, 710/301–304

(56) References Cited

U.S. PATENT DOCUMENTS

| | | | |
|---|---|---|---|
| 4,701,841 A | | 10/1987 | Goodrich et al. |
| 4,730,251 A | | 3/1988 | Aakre et al. |
| 4,740,916 A | * | 4/1988 | Martin ........................ 711/115 |
| 4,907,162 A | | 3/1990 | Fougere |
| 4,910,655 A | | 3/1990 | Ashkin et al. |
| 4,912,627 A | | 3/1990 | Ashkin et al. |
| 4,918,598 A | | 4/1990 | Ashkin et al. |
| 4,979,173 A | | 12/1990 | Geldman et al. |
| 4,985,920 A | | 1/1991 | Seki |
| 4,999,787 A | | 3/1991 | McNally et al. |
| 5,016,223 A | | 5/1991 | Kimura et al. |
| 5,068,894 A | | 11/1991 | Hoppe |
| 5,081,667 A | * | 1/1992 | Drori et al. |
| 5,131,091 A | | 7/1992 | Mizuta |
| 5,140,595 A | | 8/1992 | Geldman et al. |
| 5,226,006 A | | 7/1993 | Wang et al. |
| 5,237,609 A | | 8/1993 | Kimura |
| 5,293,424 A | | 3/1994 | Holtey et al. |
| 5,317,505 A | | 5/1994 | Karabed et al. |
| 5,319,705 A | | 6/1994 | Halter et al. |
| 5,349,649 A | * | 9/1994 | Iijima ........................ 709/228 |
| 5,361,005 A | | 11/1994 | Slattery et al. |
| 5,365,045 A | * | 11/1994 | Iijima ........................ 235/380 |
| 5,367,149 A | | 11/1994 | Takahira |
| 5,388,083 A | | 2/1995 | Assar et al. |
| 5,418,752 A | | 5/1995 | Harari et al. |

(Continued)

FOREIGN PATENT DOCUMENTS

| | | | |
|---|---|---|---|
| DE | 29613771 | 8/1996 | |
| EP | 639916 A2 * | 2/1995 | ........... H04L/29/06 |
| JP | 5046461 | 2/1993 | |
| JP | 5233426 | 8/1993 | |
| JP | 844628 | 2/1996 | |
| JP | 9147581 | 6/1997 | |
| JP | 10079197 | 2/1999 | |
| WO | WO9701825 | 1/1997 | |
| WO | WO9729454 | 8/1997 | |
| WO | WO9738370 | 10/1997 | |
| WO | WO9738371 | 10/1997 | |

OTHER PUBLICATIONS

User's Manual for the SupraExpress 288 and the SupraExpress 288i PnP 1995 pp. 40–41,62–67.*

"The MultiMediaCard System Specification," *MMCA Technical Committee*, Version 1.4, (Official Release Feb. 1988) pps. 1–106.

"Compact Flash Specification," Compact Flash Association, Revision 1.0, 1996.

Research Disclosure #356045.entitled Transparent Access of Data on Combination Card Supporting Both the PCMCIA AIMS and IDE/ATA, pp. 1–3.

*Primary Examiner*—Paul R. Myers
(74) *Attorney, Agent, or Firm*—Parsons Hsue & de Runtz LLP (57) ABSTRACT

An universal and detachable low cost data storage system adaptable to different communication protocols. Particularly, the storage system can be attached to hosts running different communication protocols such as MultiMediaCard and Serial Peripheral Interface. The storage system automatically selects the protocol in response to the host requirements such that the entire protocol selection process will be transparent to the host.

36 Claims, 5 Drawing Sheets

U.S. PATENT DOCUMENTS

| Patent | | Date | Inventor | Ref |
|---|---|---|---|---|
| 5,420,412 | A * | 5/1995 | Kowalski | 235/492 |
| 5,426,432 | A | 6/1995 | Sanemitsu | |
| 5,428,685 | A | 6/1995 | Kadooka et al. | |
| 5,430,859 | A | 7/1995 | Norman et al. | |
| 5,455,721 | A | 10/1995 | Nemazie et al. | |
| 5,477,103 | A | 12/1995 | Romano et al. | |
| 5,479,638 | A | 12/1995 | Assar et al. | |
| 5,485,595 | A | 1/1996 | Assar et al. | |
| 5,490,117 | A | 2/1996 | Oda et al. | |
| 5,495,422 | A | 2/1996 | Olson | |
| 5,495,594 | A * | 2/1996 | MacKenna et al. | 710/11 |
| 5,499,242 | A | 3/1996 | Lee et al. | |
| 5,523,724 | A | 6/1996 | Assar et al. | |
| 5,523,979 | A | 6/1996 | Nemazie | |
| 5,524,362 | A | 6/1996 | Quandt et al. | |
| 5,534,801 | A | 7/1996 | Wu et al. | |
| 5,535,368 | A | 7/1996 | Ho et al. | |
| 5,537,360 | A * | 7/1996 | Jones et al. | 365/226 |
| 5,544,335 | A * | 8/1996 | Motomura | 709/228 |
| 5,559,965 | A | 9/1996 | Oztaskin et al. | |
| 5,576,910 | A | 11/1996 | Romano et al. | |
| 5,579,502 | A | 11/1996 | Konishi et al. | |
| 5,581,708 | A * | 12/1996 | Iijima | 710/11 |
| 5,586,306 | A | 12/1996 | Romano et al. | |
| 5,592,641 | A | 1/1997 | Fandrich et al. | |
| 5,594,686 | A | 1/1997 | Hazen et al. | |
| 5,594,874 | A | 1/1997 | Narayanan et al. | |
| 5,596,526 | A | 1/1997 | Assar et al. | |
| 5,604,880 | A | 2/1997 | Dipert | |
| 5,606,660 | A | 2/1997 | Estakhri et al. | |
| 5,613,096 | A * | 3/1997 | Danknick | 709/236 |
| 5,613,130 | A | 3/1997 | Teng et al. | |
| 5,613,135 | A | 3/1997 | Sakai et al. | |
| 5,613,159 | A | 3/1997 | Colnot | |
| 5,623,637 | A | 4/1997 | Jones et al. | |
| 5,627,416 | A | 5/1997 | Kantner | |
| 5,630,170 | A * | 5/1997 | Koizumi et al. | 710/12 |
| 5,644,750 | A | 7/1997 | Iijima | |
| 5,651,116 | A * | 7/1997 | Roux | 710/11 |
| 5,666,412 | A | 9/1997 | Handelman et al. | |
| 5,668,760 | A | 9/1997 | Hazen | |
| 5,673,316 | A | 9/1997 | Auerbach et al. | |
| 5,678,021 | A | 10/1997 | Pawate et al. | |
| 5,678,056 | A | 10/1997 | Nakamura | |
| 5,696,775 | A | 12/1997 | Nemazie et al. | |
| 5,708,715 | A | 1/1998 | Vicard | |
| 5,737,742 | A | 4/1998 | Achiwa et al. | |
| 5,740,358 | A | 4/1998 | Geldman et al. | |
| 5,754,890 | A | 5/1998 | Holmdahl et al. | |
| 5,764,761 | A | 6/1998 | Vicard | |
| 5,768,043 | A | 6/1998 | Nemazie et al. | |
| 5,774,546 | A | 6/1998 | Handelman et al. | |
| 5,790,796 | A * | 8/1998 | Sadowsky | |
| 5,799,171 | A * | 8/1998 | Kondou | 395/500.48 |
| 5,815,426 | A | 9/1998 | Jigour et al. | |
| 5,818,350 | A | 10/1998 | Estakhri et al. | |
| 5,818,781 | A | 10/1998 | Estakhri et al. | |
| 5,822,245 | A | 10/1998 | Gupta et al. | |
| 5,835,935 | A | 11/1998 | Estakhri et al. | |
| 5,838,614 | A | 11/1998 | Estakhri et al. | |
| 5,845,313 | A | 12/1998 | Estakhri et al. | |
| 5,848,438 | A | 12/1998 | Nemazie et al. | |
| 5,852,617 | A * | 12/1998 | Mote, Jr. | |
| 5,864,568 | A | 1/1999 | Nemazie et al. | |
| 5,867,428 | A | 2/1999 | Ishii et al. | |
| 5,875,415 | A * | 2/1999 | Lieb et al. | |
| 5,881,252 | A | 3/1999 | Sahgal et al. | |
| 5,892,824 | A * | 4/1999 | Beatson et al. | |
| 5,905,885 | A * | 5/1999 | Richter et al. | 395/500.44 |
| 5,905,993 | A | 5/1999 | Shinohara | |
| 5,907,856 | A | 5/1999 | Estakhri et al. | |
| 5,909,596 | A | 6/1999 | Mizuta | |
| 5,920,197 | A | 7/1999 | Price et al. | |
| 5,920,731 | A | 7/1999 | Pletl et al. | |
| 5,924,113 | A | 7/1999 | Estakhri et al. | |
| 5,928,370 | A | 7/1999 | Asnaashari | |
| 5,930,815 | A | 7/1999 | Estakhri et al. | |
| 5,933,026 | A | 8/1999 | Lersen et al. | |
| 5,943,481 | A * | 8/1999 | Wakeland | 370/466 |
| 5,946,714 | A | 8/1999 | Miyauchi | |
| 5,953,737 | A | 9/1999 | Estakhri et al. | |
| 5,966,720 | A | 10/1999 | Itoh et al. | |
| 6,018,265 | A | 1/2000 | Keshtbod | |
| 6,025,966 | A | 2/2000 | Nemazie et al. | |
| 6,026,293 | A | 2/2000 | Osborn | |
| 6,034,897 | A | 3/2000 | Estakhri et al. | |
| 6,038,400 | A * | 3/2000 | Bell et al. | 710/11 |
| 6,040,997 | A | 3/2000 | Estakhri | |
| 6,041,001 | A | 3/2000 | Estakhri | |
| 6,073,205 | A | 6/2000 | Thomson | |
| 6,076,137 | A | 6/2000 | Asnaashari | |
| 6,081,878 | A | 6/2000 | Estakhri et al. | |
| 6,084,483 | A | 7/2000 | Keshtbod | |
| 6,115,785 | A | 9/2000 | Estakhri et al. | |
| 6,122,195 | A | 9/2000 | Estakhri et al. | |
| 6,125,435 | A | 9/2000 | Estakhri et al. | |
| 6,128,695 | A | 10/2000 | Estakhri et al. | |
| 6,134,151 | A | 10/2000 | Estakhri et al. | |
| 6,138,180 | A | 10/2000 | Zegelin | |
| 6,141,249 | A | 10/2000 | Estakhri et al. | |
| 6,144,607 | A | 11/2000 | Sassa | |
| 6,145,037 | A | 11/2000 | Skakiara | |
| 6,145,051 | A | 11/2000 | Estakhri et al. | |
| 6,151,247 | A | 11/2000 | Estakhri et al. | |
| 6,172,906 | B1 | 1/2001 | Estakhri et al. | |
| 6,173,314 | B1 | 1/2001 | Kurashima et al. | |
| 6,175,770 | B1 | 1/2001 | Bladow | |
| 6,182,162 | B1 * | 1/2001 | Estakhri et al. | 710/11 |
| 6,202,138 | B1 | 3/2001 | Estakhri et al. | |
| 6,223,308 | B1 | 4/2001 | Estakhri et al. | |
| 6,230,234 | B1 | 5/2001 | Estakhri et al. | |
| 6,262,918 | B1 | 7/2001 | Estakhri et al. | |
| 6,266,720 | B1 | 7/2001 | Kakinoki | |
| 6,266,725 | B1 | 7/2001 | Deveaud | |
| 6,314,480 | B1 | 11/2001 | Nemazie et al. | |
| 6,327,639 | B1 | 12/2001 | Asnaashari | |
| 6,339,831 | B1 | 1/2002 | Sugawara et al. | |
| 6,360,220 | B1 | 3/2002 | Forin | |
| 6,374,337 | B1 | 4/2002 | Estakhri | |
| 6,393,513 | B2 | 5/2002 | Estakhri et al. | |
| 6,397,314 | B1 | 5/2002 | Estakhri et al. | |
| 6,404,246 | B1 | 6/2002 | Estakhri et al. | |
| 6,411,546 | B1 | 6/2002 | Estakhri et al. | |
| 6,462,986 | B1 | 10/2002 | Khan | |
| 6,484,216 | B1 | 11/2002 | Zegelin | |
| 6,490,649 | B2 | 12/2002 | Sinclair | |

\* cited by examiner

| Pin # | MMC | | | SPI | | |
|---|---|---|---|---|---|---|
| | Name | Type[1] | Description | Name | Type | Description |
| 1 | RSV | NC | Reserved For Future Use | CS | I | Chip Select (Neg True) |
| 2 | CMD | I/O/PP/OD | Command/ Response | DI | I/PP | Data In |
| 3 | $V_{SS1}$ | S | Supply Voltage Ground | VSS | S | Supply Voltage Ground |
| 4 | $V_{DD}$ | S | Supply Voltage | VDD | S | Supply Voltage |
| 5 | CLK | I | Clock | SCLK | I | Clock |
| 6 | $V_{SS2}$ | S | Supply Voltage Ground | VSS2 | S | Supply Voltage Ground |
| 7 | DAT | I/O/PP | Data | DO | O/PP | Data Out |

FIG._4

| OCR Bit Position | VDD Voltage Window |
|---|---|
| 0-7 | Reserved |
| 8 | 2.0-2.1 |
| 9 | 2.1-2.2 |
| 10 | 2.2-2.3 |
| 11 | 2.3-2.4 |
| 12 | 2.4-2.5 |
| 13 | 2.5-2.6 |
| 14 | 2.6-2.7 |
| 15 | 2.7-2.8 |
| 16 | 2.8-2.9 |
| 17 | 2.9-3.0 |
| 18 | 3.0-3.1 |
| 19 | 3.1-3.2 |
| 20 | 3.2-3.3 |
| 21 | 3.3-3.4 |
| 22 | 3.4-3.5 |
| 23 | 3.5-3.6 |
| 24-30 | Reserved |
| 31 | Card Power Up Status Bit (Busy)[1] |

FIG._5
*(PRIOR ART)*

| Name | Field | Width | CID-slice |
|---|---|---|---|
| Manufacturer ID | MID | 24 | [127:104] |
| Card Individual Number | CIN | 96 | [103:8] |
| CRC7 Checksum | CRC | 7 | [7:1] |
| Not Used, Always '1' | – | 1 | [0:0] |

FIG._6
*(PRIOR ART)*

| Name | Field | Width | Cell Type | CSD-slice |
|---|---|---|---|---|
| CSD Structure | CSD_STRUCTURE | 2 | R | [127:126] |
| MMC Protocol Version | MMC_PROT | 4 | R | [125:122] |
| Reserved | - | 2 | R | [121:120] |
| Data Read Access-time-1 | TAAC | 8 | R | [119:112] |
| Data Read Access-time-2 in CLK Cycles (NSAC*100) | NSAC | 8 | R | [111:104] |
| Max. Data Transfer Rate | TRAN_SPEED | 8 | R | [103:96] |
| Card Command Classes | CCC | 12 | R | [95:84] |
| Max. Read Data Block Length | READ_BL_LEN | 4 | R | [83:80] |
| Partial Blocks For Read Allowed | READ_BL_PARTIAL | 1 | R | [79:79] |
| Write Block Misalignment | WRITE_BLK_MISALIGN | 1 | R | [78:78] |
| Read Block Misalignment | READ_BLK_MISALIGN | 1 | R | [77:77] |
| DSR Implemented | DSR_IMP | 1 | R | [76:76] |
| External $V_{PP}$ | VPROG | 2 | R | [75:74] |
| Device Size Mantissa | C_SIZE_MANT | 8 | R | [73:66] |
| Device Size Exponent | C_SIZE_EXP | 4 | R | [65:62] |
| Max. Read Current @ $V_{DD}$ Min | VDD_R_CURR_MIN | 3 | R | [61:59] |
| Max. Read Current @ $V_{DD}$ Max | VDD_R_CURR_MAX | 3 | R | [58:56] |

| Name | Field | Width | Cell Type | CSD-slice |
|---|---|---|---|---|
| Max. Write Current @ $V_{DD}$ Min | VDD_W_CURRENT_MIN | 3 | R | [55:53] |
| Max. Write Current @ $V_{DD}$ Max | VDD_W_CURRENT_MAX | 3 | R | [52:50] |
| Max $V_{PP}$ Current | VPP_CURR | 3 | R | [49:47] |
| Erase Sector Size | SECTOR_SIZE | 5 | R | [46:42] |
| Erase Group Size | ERASE_GRP_SIZE | 5 | R | [41:37] |
| Write Protect Group Size | WP_GRP_SIZE | 5 | R | [36:32] |
| Write Protect Group Enable | WP_GRP_ENABLE | 1 | R | [31:31] |
| Manufacturer Default ECC | DEFAULT_ECC | 2 | R | [30:29] |
| Stream Write Speed Factor | R2W_FACTOR | 3 | R | [28:26] |
| Max. Write Data Block Length | WRITE_BL_LEN | 4 | R | [25:22] |
| Partial Blocks For Write Allowed | WRITE_BL_PARTIAL | 1 | R | [21:21] |
| Reserved | | 5 | R | [20:16] |
| Reserved | | 3 | R/W | [15:13] |
| Copy Flag (OTP) | COPY | 1 | R/W | [12:12] |
| Permanent Write Protection | PERM_WRITE_PROTECT | 1 | R/W | [11:11] |
| Temporary Write Protection | TMP_WRITE_PROTECT | 1 | R/W/E | [10:10] |
| ECC Code | ECC | 2 | R/W/E | [9:8] |
| CRC | CRC | 7 | R/W/E | [7:1] |
| Not Used, Always '1' | - | 1 | - | [0:0] |

FIG._7
*(PRIOR ART)*

| Name | Available in SPI Mode | Width [Bytes] | Description |
|------|----------------------|---------------|-------------|
| CID | Yes | 16 | Card Identification Data (Serial Number, Manufacturer ID etc.) |
| RCA | No | | |
| DSR | No | | |
| CSD | Yes | 16 | Card Specific Data, Information About the Card Operation Conditions. |
| OCR | No | | |

MULTIPLE MODE COMMUNICATIONS SYSTEM

BACKGROUND OF THE INVENTION

The present invention is directed to a low cost data storage and communication system. More particularly, the present invention relates to an universal and detachable low cost data storage adaptable to different communication protocols.

There have been continuous development in the universal and detachable storage and communication system having detachable cards such as memory cards. Each of these systems usually comprises a host and at least one detachable card connected to the host for providing additional storage to the system.

In general, these multicard systems are designed for use in a wide area of applications as electronic toys, organizers, PDAs, cameras, smart phones, digital recorders, pagers, etc. Targeted features are high mobility and high performance at low cost price. For example, extra storage can be added to any application systems (i.e. the host), or I/O interfaces can be provided for the host to communicate with other systems.

In some circumstances, the card can be pre-loaded with application software and/or data and then sold to consumers to be used with multicard systems. Specifically, the card can comprise EEPROM or FLASH memory so that software and data can be preloaded and changed by the Multi-Media Card host. The use of the card as a storage device is versatile that any database (e.g. dictionary, phone books, etc.) can be connected to the multicard system when needed.

There are currently various communication protocols defining the communication between the host and the cards. In most of the case, cards designed for one protocol cannot operate with another host running a different communication protocol. This incompatibility between different communication protocols creates tremendous inconvenience in design because of the need for the card designer to design different version of card for different protocols.

Therefore it is preferably to have one card manufactured for communicating in different protocols so that the same card can be used in different multicard systems.

SUMMARY OF THE INVENTION

It is therefore an object of this invention to provide a single host multiple slave communication system.

It is another object of this invention to provide a single host multiple slave(s) communication system capable of communicating through different protocols.

It is yet another object of this invention to provide a single host multiple slave(s) communication system capable of communicating through MultiMediaCard protocol.

It is yet another object of this invention to provide a single host multiple slave(s) communication system capable of communicating through Serial Peripheral Interface protocol.

It is yet another object of this invention to provide a single host multiple slave(s) communication system capable of communicating through both MultiMediaCard and Serial Peripheral Interface protocols.

BRIEF DESCRIPTION OF THE DRAWINGS

FIG. 7 shows a format of a CSD register of the preferred embodiment according the present invention.

DETAIL DESCRIPTIONS OF THE DRAWINGS

There are currently two most common communication protocols used in the industry for small form factor memory cards. These two protocols are MultiMediaCard system and the Serial Peripheral Interface system.

Figures 1, 2:
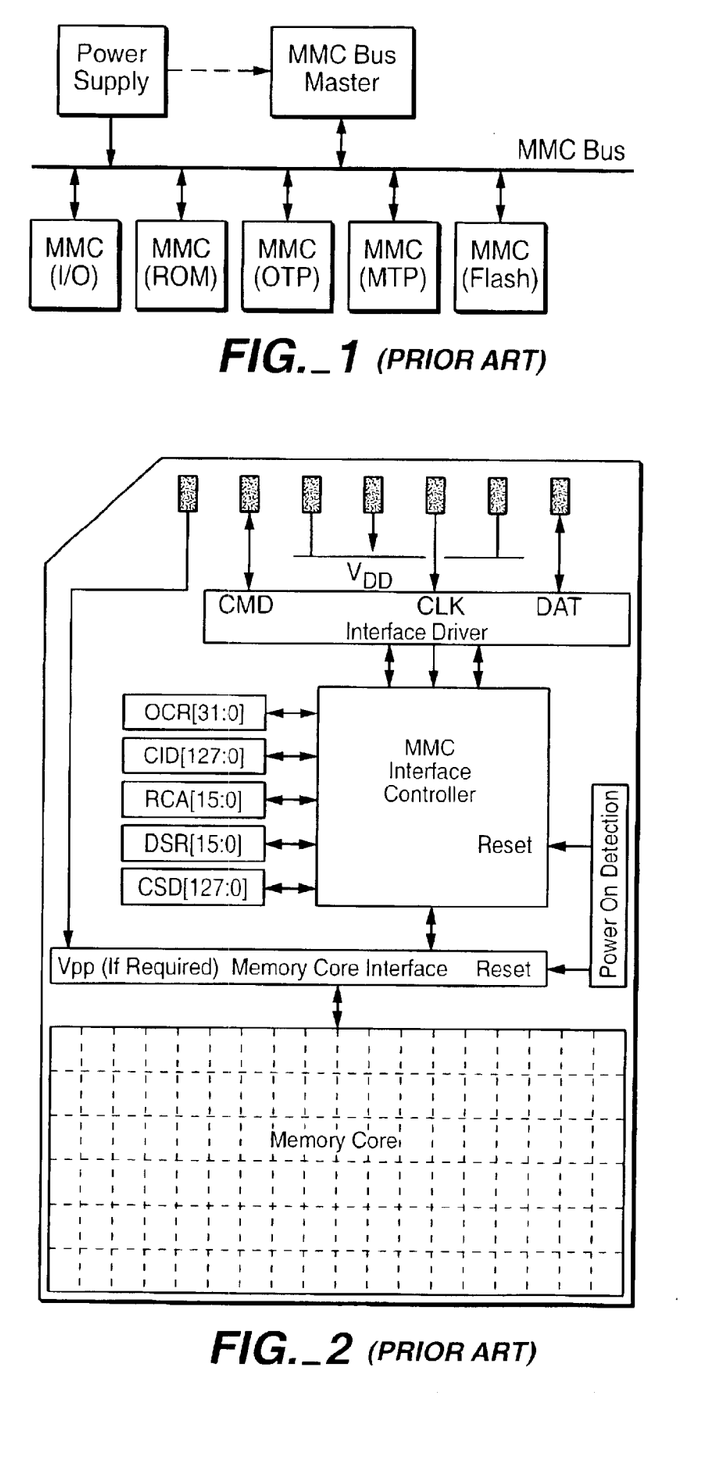
FIG. 1 shows a multicard system communicating under MultiMediaCard protocol of a preferred embodiment according the present invention
FIG. 2 shows an internal structure of a MultiMediaCard card of a preferred embodiment according to the present invention.

The first communication protocol MultiMediaCard system is a new emerging standard employing a bus concept as shown in FIG. 1. In the system as shown in FIG. 1, a MultiMediaCard host is connected to several MultiMediaCard cards by a MultiMediaCard bus. The MultiMediaCard bus is a single master bus controlling a variable number of cards/slaves. The MultiMediaCard host is a bus controller, and each card can either be a single mass storage card (with possible different technologies such as ROM, OTP, Flash etc.) or an I/O card with its own controlling unit (on card) to perform the data transfer.

FIG. 2 shows an internal structure of a typical MultiMediaCard card. As shown in the figure, each card can handle up to seven communication lines (No. 1 . . . 7). In the MultiMediaCard protocol, lines 2, 4–5, and 7 are assigned for voltage supply and communications: VDD, CLK, CMD, and DAT. Lines 3 and 6 can be used as two supply voltage ground for the card. Line 1 is left open reserved for future uses.

According to the MultiMediaCard protocol, the VDD line is used for providing power supply to the card. The other three communication signals are clock CLK, command CMD, and data DAT. The clock CLK is used by the host to provide a timing means to each card. In each cycle of this CLK signal, an one bit transfer on the command and data lines is done. The CMD line is a bidirectional command channel between the host and the slaves used for card initialization and data transfer commands. Under the MultiMediaCard protocol, commands are sent from the MultiMediaCard host to the card using the command line CMD. In addition, the cards respond to the command by sending a response to the host using the CMD line. The DAT line is also a bidirectional data channel between the host and the slaves. In the MultiMediaCard system, one of the cards or the host can be driving this DAT signal at a time. The detail of the MultiMediaCard protocol is disclosed fully in "The MultiMediaCard System Specification", Version 1.4 by the MMCA Technical Committee, and the entire specification is hereby incorporated by reference.

The second communication protocol is the Serial Peripheral Interface. The Serial Peripheral Interface is a general purpose synchronous serial interface. This communication protocol is originally used in certain Motorola (TM)

microcontrollers, and has been gaining acceptances in the industry. A virtual identical interface can now be found on certain Texas Instrument (TM) and SGS Thomson (TM) microcontrollers as well.

Under the Serial Peripheral Interface protocol, there is a Serial Peripheral Interface common bus connecting the host with the cards. There are at least four signals for the communications between the host and the cards. They are chip select ("CS"), clock signal (CLK), data in ("DataIn"), and data out ("DataOut"). The clock signal CLK is used to provide a synchronizing means among all the components. The DataIn is for transferring data from the host to the card. The DataOut is for transferring data from the card to the host.

In the Serial Peripheral Interface protocol, there are a plurality of chip select signals CS. Each of the chip select signals CS connects the host to one of the plurality cards. Each chip select signal CS is used by the host to select a specific card for communications between the host and the card. In addition, the Serial Peripheral Interface common bus comprises only three common signals shared by all the cards (i.e. CLK, DataIn, and DataOut).

Figure 3:
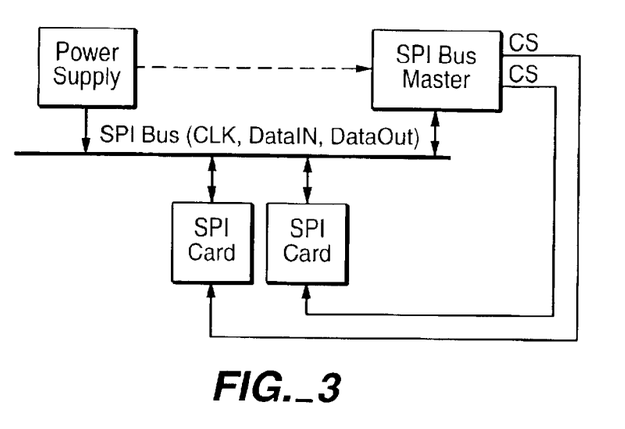
FIG. 3 shows a basic configuration of a multicard system operating under the Serial Peripheral Interface protocol according to a preferred embodiment of the present invention.

FIG. 3 illustrates a basic configuration of a single host and multicard system employing the Serial Peripheral Interface protocol. The system as shown comprise a host and 2 cards. As discussed in the previous paragraph, there are only three signals in the Serial Peripheral Interface common bus serving the host and the two cards: CLK, DataIn, and DataOut. In addition, the Serial Peripheral Interface host generates two chip select signals, one chip select signal for each card. Using the two chip select signals, each individual card can be selected by the host to have sole control of the Serial Peripheral Interface common bus (i.e. CLK, DataIn, DataOut).

The present invention is directed to a multi-mode card design so that the card according to the present invention is able to communicate with hosts running in different communication protocols. The selection of communication mode is detected and determined by the card at the initialization. Specifically, the host does not need to provide the card with additional mode information. By simply plugging the card to the host, the card can detect, determine, and operate in either one of these two modes of operation. In the preferred embodiment of the present invention, the two modes are the MultiMediaCard mode and the Serial Peripheral Interface mode.

It should be noted that the entire mode selection process performed within the card is transparent to the host. Specifically, if the host only recognizes one mode (for example, the MultiMediaCard), a card according to the present invention will simply interface with the host in the MultiMediaCard mode. In this case, the host is not required to generate any initialization sequences or commands specifically for this card. Furthermore, the host will treat the card of the present invention identical with any card built only for the specific mode. For example, the card will be fully compatible with any MultiMediaCard commands issued by the host, as long as the pin connections are made appropriately. Similarly, the same operating transparency works for the Serial Peripheral Interface mode.

Furthermore, one novel characteristic of the present invention is the portability of the card to different hosts running different protocols. For example, a card of the present invention can be downloaded with data from a Serial Peripheral Interface mode host. Then the card can be transferred to be used by a MultiMediaCard mode host and the stored data can be read out according to the MultiMediaCard protocol. The entire read and write operations are transparent to either host. Each host simply treats the write or read operation according to its corresponding communication protocol. This feature provides tremendous advantages in the portability of data stored in the card of the present invention.

Therefore, in the preferred embodiment of the present invention, the card is able to respond to commands issued by host running in either mode: the MultiMediaCard mode, and the Serial Peripheral Interface mode. More particularly, the card of this present invention is designed to adapt to communicate with a host using either the MultiMediaCard or the Serial Peripheral Interface protocol.

In a preferred embodiment of the present invention, the interfacing protocol used between the host and the cards is first selected by the host during the first reset command after power up (i.e. CMD0). After each of the cards received and determined the proper mode for communications, the mode cannot be changed until the entire system is reset. For example, when the communication protocol between the host and the card is set as the Serial Peripheral Interface mode, all communications between the host and the card will only be operated using the Serial Peripheral Interface mode. On the other hand, when the communication protocol between the host and the card is set as the MultiMediaCard mode, all communications between the host and the card will only be processed using the MultiMediaCard mode. In the preferred embodiment, the protocol can only changed when the entire system is reset.

1. Mode Selection

In a preferred embodiment according the present invention, every card wakes up in the MultiMediaCard mode. If the host intends to communicate with the card(s) connected in the Serial Peripheral Interface mode, then the host begins the normal Serial Peripheral Interface mode initialization procedure by sending (903, FIG. 9) a reset command (CMD0) in the command line CMD or the DataIn line and asserting the CS signal of each card connected to the host. When the CS signal in the communication bus is asserted (negative) by the host during the reception (905, FIG. 9) of the reset command (CMD0) ("YES" 907, FIG. 9), each of the cards in the system will enter the Serial Peripheral Interface mode. All the subsequent communications between the host and the card(s) will then be performed under the Serial Peripheral Interface protocol (923, FIG. 9).

Figure 9:
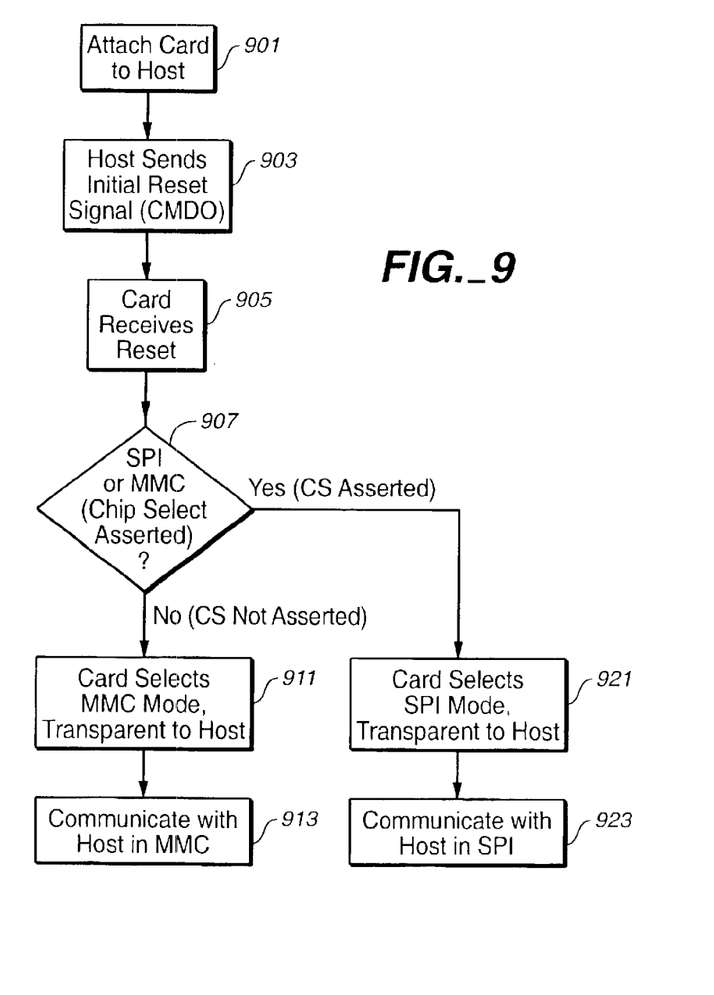
FIG. 9 is a flow chart of one embodiment of the mode selection process.

On the other hand, if the host is designed to communicate with the card(s) connected in the MultiMediaCard mode, the above-mentioned Serial Peripheral Interface initialization step (i.e. sending a reset command in the command line CMD or the DataIn line and asserting the CS signal of each card connected to the host) will not be performed ("NO" 907, FIG. 9). However, in the preferred embodiment of the present invention, each card is designed to wake up in the MultiMediaCard mode if it is not set otherwise. Thus, in the present case, the card will remain in the MultiMediaCard mode (911, FIG. 9) and will only accept and respond to MultiMediaCard commands issued by the host. All communications between the host and the card(s), in this case, will be performed under the Multi-Media Card protocol (913, FIG. 9).

Particularly, by performing the mode selection in the card(s) only, the entire mode selection is transparent to the host (911, 921, FIG. 9). In other words, the card of the present invention is able to adapt its communication protocol to hosts running in either mode (i.e. Serial Peripheral Interface mode and MultiMediaCard mode).

Particularly, by performing the mode selection in the card(s) only, the entire mode selection is transparent to the host. In other words, the card of the present invention is able to adapt its communication protocol to hosts running in either mode (i.e. Serial Peripheral Interface mode and MultiMediaCard mode).

For example, the card of the present invention can attach to a MultiMediaCard host for downloading data from the MultiMediaCard host to the card. Then, the card can be removed to a Serial Peripheral Interface host for uploading the stored data from the card to the Serial Peripheral Interface host. The entire process will be transparent to either the MultiMediaCard host or the Serial Peripheral Interface host. Thus each of the two hosts treats the card of the present invention as a card designed solely for its corresponding protocol (e.g. MultiMediaCard mode for the MultiMediaCard host, or Serial Peripheral Interface mode for the Serial Peripheral Interface host). This feature provides tremendous benefits in the portability of data to different systems.

Figure 4:
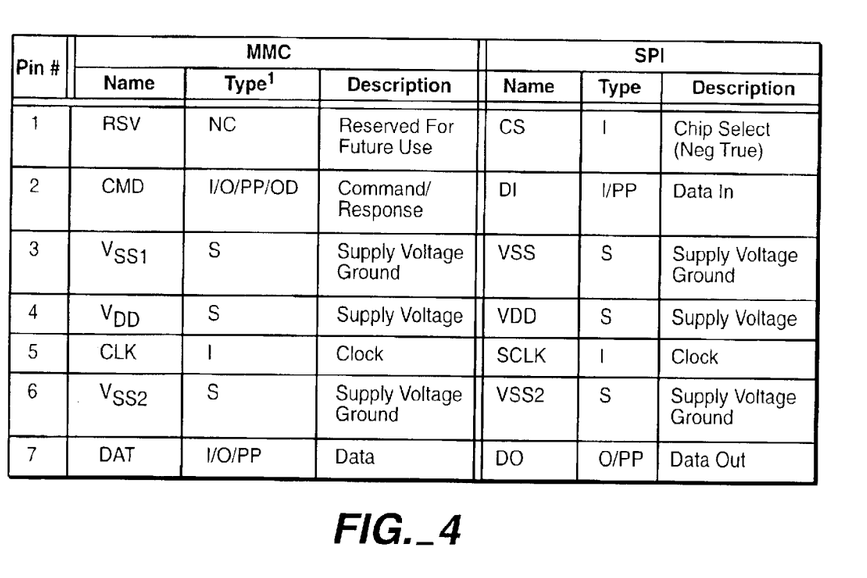
FIG. 4 shows the pin assignment of a card of a preferred embodiment according to the present invention.

FIG. 4 shows the pin assignment of a card of the preferred embodiment of the present invention designed to operate in either the MultiMediaCard mode or the Serial Peripheral Interface mode.

When the card is operating under the Serial Peripheral Interface mode, pin number one is assigned as the chip select, and pin numbers 2, 4, 5, and 7 are assigned as DataIn, Vdd, CLK, and DataOut respectively. In addition, pin numbers 3 and 6 are assigned as voltage ground.

On the other hand, when the card is operating under the MultiMediaCard mode, pin number one is not used, and pin numbers 2, 4, 5, and 7 are assigned as command CMD, Vdd, CL, and DAT respectively. In addition, pin numbers 3 and 6 are assigned as voltage ground. It should be noted that pin 1 is not used in the MultiMediaCard mode.

In this preferred embodiment, the Serial Peripheral Interface protocol defines the physical link of the communications between the host and the cards only. The internal memory storage of the card remains identical. In other words, only the card communication protocol is changed to either the MultiMediaCard mode or the Serial Peripheral Interface mode depending on the host connected.

From the application point of view, the advantage of the Serial Peripheral Interface mode is the capability of using an off-the-shelf host using the same card. The flexibility reduces the design-in effort to minimum. The disadvantage is the loss of performance of the Serial Peripheral Interface system versus MultiMediaCard (lower data transfer rate, fewer cards, hardware CS per card etc.).

2. Bus Topology

In the preferred embodiment of the present invention, the MultiMediaCard protocol is defined under the MultiMediaCard specification which is incorporated by reference in this application. In summary, when the card is running under the MultiMediaCard mode, there are three groups of communication messages for the communication between the MultiMediaCard host and the cards: Command, Response, and Data.

As detailed in the MultiMediaCard specification, the commands and responses are communicated through the use of the CMD signal while the data is transferred through the use of the DAT signal. The separation of these signals provides a unique feature of allowing communicating between the host and the cards while data is being transferred in the DAT signal.

According to the MultiMediaCard protocol, a MultiMediaCard command is a token for starting an operation between the host and one or all of the cards. Specifically, a command can be sent from the host either to a single card (i.e. addressed command) or to all connected cards (i.e. broadcast command) serially through the CMD line. An addressed command comprises a specific address of a card so that only the addressed card is allow to respond to the addressed command. On the other hand, a broadcast command is sent by the host to all cards.

A MultiMediaCard response is a token which is sent from an addressed card, or (synchronously) from all connected cards (responding a broadcast command), to the host as an answer to a previously received command on the CMD line.

Finally, as stated in the MultiMediaCard specification, data is transferred from any of the card to the host or vice versa via the DAT line.

On the other hand, in the preferred embodiment of the present invention, when the system is initialized as the Serial Peripheral Interface mode, the card identification and addressing methods are replaced by a hardware Chip Select (CS) signal. Specifically, in the Serial Peripheral Interface mode, there are no broadcast commands from the host. For every command, a card (slave) is selected by asserting (active low) the CS signal.

When a card is selected for the Serial Peripheral Interface mode, the CS signal of the card must be continuously active for the duration of the Serial Peripheral Interface transaction (command, response and data). By selecting only one card in a multicard system, the DataIn (i.e. CMD) and DataOut (i.e. DAT) are used only by the selected card. The only exception occurs during card programming, when the host can deassert the CS signal without affecting the programming process.

It should be noted that, in the preferred embodiment of the present invention, in the Serial Peripheral Interface mode, the bidirectional CMD and DAT lines are replaced by unidirectional DataIn and DataOut signals. By self-assigning the lines according to the Serial Peripheral Interface protocol, this eliminates the card's ability of executing commands while data is being read or written as in the MultiMediaCard mode.

In addition, according to the protocols, the Serial Peripheral Interface channel is byte oriented while the Multi-Media Card channel is based on command and data bitstreams which are initiated by a start bit and terminated by a stop bit. Particularly, in the Serial Peripheral Interface mode, every command or data block is built of 8-bit bytes and is byte aligned to the CS signal (i.e. the length is a multiple of 8 clock cycles).

Similar to the MultiMediaCard mode, the Serial Peripheral Interface messages include command, response and data-block tokens. Specifically, all communications in either mode between host and cards are controlled by the host.

The differences in the response behavior between the Serial Peripheral Interface mode and the MultiMediaCard mode can be summarized as following:

1. In the Serial Peripheral Interface mode, the selected card (selected by the CS signal) always responds to a command.
2. An additional (8-bit) response structure is used in the Serial Peripheral Interface mode.
3. When the card encounters a data retrieval problem, the card running under the Serial Peripheral Interface will respond with an error response (which replaces the expected data block) rather than by a time-out as in the MultiMediaCard mode.

In addition to the command response, every data block sent to the card during write operations will be responded with a special data response token. A data block may be as big as one card sector and as small as a single byte. Partial block read/write operations are enabled by card options specified in the CSD register.

3. Card Registers

In the preferred embodiment of the present invention, when the system is communicating under the MultiMediaCard mode, each card uses all card registers located in the card. In the preferred embodiment as shown in FIG. 2, each card comprises a group of registers for storing a variety of status and internal information. These registers are used for providing information to the host system for determining detail communication parameters between the host and the cards. In the preferred embodiment, five registers, OCR, CID, CSD, RCA, and DSR are used to store the information. In the preferred embodiment, when the card is running under the MultiMediaCard mode, all these five registers can be accessed by the host by issuing a specific set of commands.

Specifically, the OCR, CID and CSD registers carry the card/content specific information, while the RCA and DSR registers are configuration registers storing actual configuration parameters.

a. OCR Register

Figure 5:
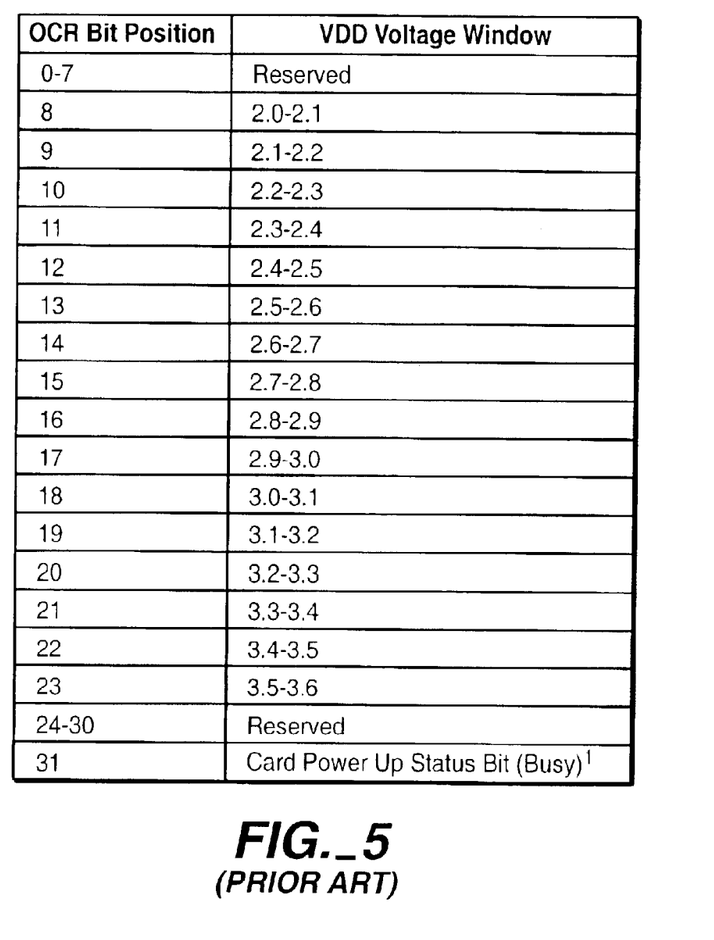
FIG. 5 shows a format of an OCR register of the preferred embodiment according to the present invention.

FIG. 5 shows the format of an OCR register of the preferred embodiment according to the present invention. The OCR register as shown is a 32-bit register storing the Vdd voltage profile of the card. In addition, the OCR register also includes a status information bit (i.e. bit 31). This status bit is set if the card power procedure has been finished. The register can be designated as read only. The OCR register is implemented by cards which do not support the full operating voltage range of the MultiMediaCard bus, or if the card power up extends the definition in the timing diagram.

To indicate the operating voltage range for the MultiMediaCard card, the corresponding bits indicating the voltage bit supported by the card are set to high. On the other hand, the voltages are not supported if the corresponding bits are set to LOW. For example, a MultiMediaCard card having an independent operating voltage range of to 2.6–3.4V has a OCR value of:

00000000 00000111 11111000 00000000 b. CID register

Figure 6:
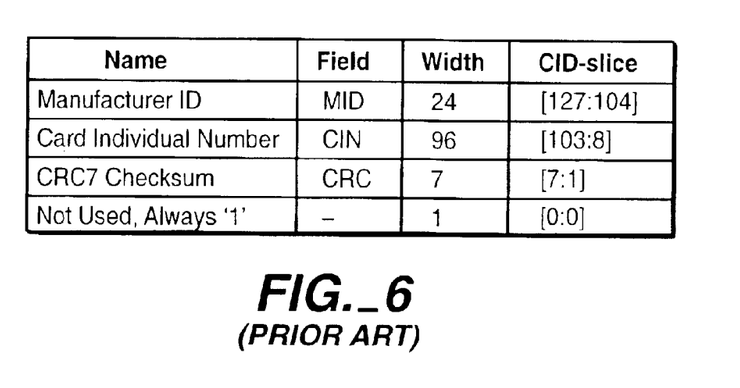
FIG. 6 shows a format of a CID register of the preferred embodiment according to the present invention.

In the preferred embodiment of the present invention, this register carries a card identification number (Card ID) used during the card identification procedure. As shown in FIG. 6, the CID register of the preferred embodiment is a 128-bit wide register divided into three slices: Manufacturer ID, Card Individual Number, and CRC7 checksum.

c. CSD Register

FIG. 7 shows the format of a Card-Specific Data register ("CSD") of a preferred embodiment according to the present invention. The CSD register is responsible for providing information to the MultiMediaCard host on how to access the card content. Specifically, the CSD register stores values defining the data format, error correction type, maximum data access time, data transfer speed, whether the DSR register can be used, etc. The type of the entries is coded as follow: R=readable, W=writeable once, E=erasable (multiple writable). The programmable part of the register (i.e. entries marked by W or E) can be changed by the command CMD 27 issued by the MultiMediaCard host.

d. RCA Register

In the preferred embodiment of the present invention, the relative card address register (RCA) is a writable 16-bit register carrying the card address assigned by the host during the card identification. This address is used for the addressed host-card communication after the card identification procedure. In the preferred embodiment, the default value of the RCA register is 0x0001. In addition, the value 0x0000 is reserved to set all cards into the Stand-by State with CMD7.

e. DSR Register

In the preferred embodiment of the present invention, the driver stage register (DSR) is a 16-bit register. The DSR register can be optionally used to improve the bus performance for extended operating conditions (depending on parameters like bus length, transfer rate or number of cards). Particularly, the CSD register carries the information about the DSR register usage in its DSR_IMP field. In the preferred embodiment, the default value of the DSR register is 0x404.

All these five registers are used by the card when the card is running under the MultiMediaCard protocol.

Figure 8:
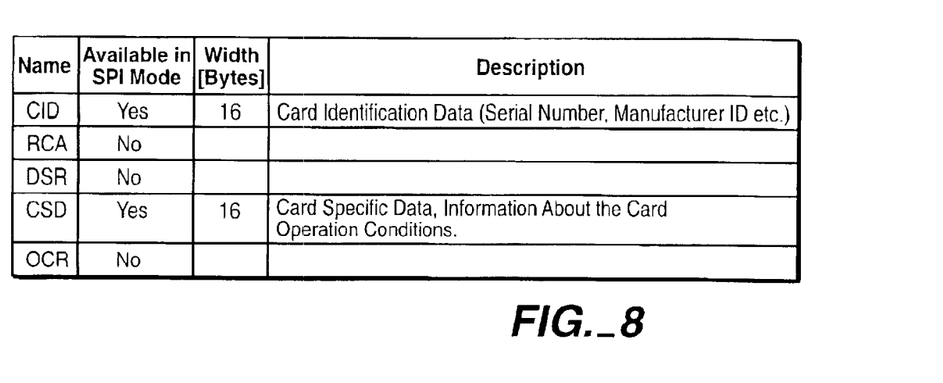
FIG. 8 shows the usage of the five registers in the Serial Peripheral Interface mode.

On the other hand, it should be noted that, in the preferred embodiment of the present invention, when the card is running under the Serial Peripheral Interface mode, only three registers are used by the card: OCR, CID and CSD registers. The registers usage in Serial Peripheral Interface mode is summarized in FIG. 8. Since the card in the Serial Peripheral Interface mode is selected by the chip select CS, the information provided by the RSA, DSR, and OCR registers are not needed by the card.

4. Bus Transfer Protection

In the preferred embodiment of the present invention, every MultiMediaCard token transferred on the bus is protected by CRC bits. On the other hand, in the Serial Peripheral Interface mode, the multicard system of the present invention offers a non protected mode which enables systems built with reliable data links to exclude the hardware or firmware required for implementing the CRC generation and verification functions.

In a non-protected mode, the CRC bits of the command, response and data tokens are still required in the tokens. However, they are defined as "don't care" for the transmitter and ignored by the receiver.

In the preferred embodiment, the Serial Peripheral Interface interface is initialized in the non-protected mode. The host can turn this option on and off using the CRC_ON_OFF command (CDM59).

5. Data Read

In the preferred embodiment of the present invention, the data read is handled differently between the MultiMediaCard mode and the Serial Peripheral Interface mode. For example, under the MultiMediaCard mode, both stream read and block read can be handled by the system of the present invention:

a. Stream Read

When a card of the present invention is running under the MultiMediaCard mode, the preferred system allows a stream oriented data transfer. The stream oriented data transferred is controlled by a READ_DAT_UNTIL_STOP command (i.e. CMD11). This addressed command instructs the selected card to send its payload, starting at a specific address, until the host sends a STOP_TRANSMISSION command (i.e. CMD12). The stop command (CMD12) has an execution delay due to the serial command transmission. Therefore, the data transfer stops after the end bit of the stop command.

In the preferred embodiment, the maximum clock frequency for stream read operation is given by the following formula:

A specific block length is defined in the CSD (READ_BL_LEN=<value>)

max.speed=min ((TRAN_SPEED), (READ_BL_LEN/(NSAC+TAAC))

Any block length allowed in the CSD (READ_BL_LEN='any')

Max.speed=TRAN_SPEED

If the host attempts to use a higher frequency, the card may not be able to sustain data transfer. If a unsustained frequency is used, the card will set the UNDERRUN error bit in the status register, abort the transmission and wait in the data state for a stop command.

b. Block Read (i) MultiMediaCard Mode

In addition, when a card of the present invention is operating in the MultiMediaCard mode, the system is allowed to execute block read command. The block read command is similar to the stream read as discussed above except that the basic unit of data transfer is a block. In the preferred embodiment, the maximum block size is defined in the READ_BL_LEN field in the CSD register. If the READ_BL_PARTIAL field is set, smaller blocks whose starting and ending addresses are entirely contained within one physical block (as defined by READ_BL_LEN) may also be transmitted. Unlike the stream read command, a CRC is appended to the end of each block ensuring data transfer integrity.

The READ_SINGLE_BLOCK command (i.e. CMD17) initiates a block read. After completing a block transfer, the card returns to the Transfer State. On the other hand, the READ_MULTIPLE_BLOCK command (i.e. CMD18) starts a transfer of several consecutive blocks. In this case, blocks of data will be continuously transferred until a stop command is issued.

If the host uses partial blocks whose accumulated length is not block aligned and block misalignment is not allowed, the card will indicate a block misalignment at the beginning of the first misaligned block. The card will set the ADDRESS_ERROR error bit in the status register, and then abort the data transmission and wait in the Data State for a stop command.

(ii) Serial Peripheral Interface Mode

Similar to the MultiMediaCard mode, when a card is operating under the Serial Peripheral Interface mode, the system also supports the multi-block read operation. Upon reception of a valid read command, the card will respond with a response token followed by a data token of the length defined in a previous SET_BLOCKLEN (CMD16) command.

In the preferred embodiment, a valid data block is suffixed with a 16 bit CRC generated by the standard CCITT polynomial $X^{16}+X^{12}+X^5+1$.

The maximum block length is given by READ_BL_LEN, defined in the CSD. If partial blocks area allowed (i.e. the CSD parameter READ_BL_PARTIAL equals 1), the block length can be any number between 1 and the maximum block size. Otherwise, the only valid block length for data read is given by READ_BL_LEN.

In the preferred embodiment, the start address can be any byte address in the valid address range of the card. Every block, however, must be contained in a physical card sector.

In case of a data retrieval error, the card will not transmitted data. Instead, a special data error token will be sent to the host.

6. Data Write

Similar to the above-discussed data read section, there are also differences between writing data to the card when the system of the preferred embodiment is operating in either mode.

Under the MultiMediaCard mode, the protocol of writing data to the card is similar to the data read protocol. However, for block oriented write data transfers, the CRC check bits are added to each data block. Specifically, the card performs a CRC parity check for each received data block prior to the write operation. By using the CRC mechanism, therefore, writing of erroneously transferred data can be prevented.

a. Stream Write

Similar to the stream read command of the preferred embodiment as discussed, the stream write command (i.e. CMD20) provides a starting address to the card. Then the host begins transferring data to the card beginning with the starting address until the host issues a stop command to terminate the data transfer. If partial blocks are allowed (if CSD parameter (WRITE_BL_PARTIAL is set) in the preferred embodiment, the data stream can start and stop at any address within the card address space. Otherwise the data transfer starts and stops only at block boundaries. Since the amount of data to be transferred is not determined in advance, CRC cannot be used. If the end of the memory range is reached when data is still being sent and no stop command has been received by the card, all further transferred data will be discarded.

Similarly, the maximum clock frequency for stream write operation is given by the following formula:

A specific block length is defined in the CSD (WRITE_BL_LEN=<value>)

max.speed=min ((TRAN_SPEED), ((WRITE_BL_LEN/(NSAC+TAAC))/SW_FACTOR)

Any block length allowed in the CSD (WRITE_BL_LEN='any')

Max.speed=TRAN_SPEED/SW_FACTOR

In this preferred embodiment, if the host attempts to use a higher frequency, the card may not be able to process the data and the data writing will be stopped. Then the OVERRUN error bit in the status register will be set, and all further data transfer will be ignored while waiting (in the Receive-data-State) for a stop command. The write operation will also be terminated if the host tries to write over a write protected area. In the present invention, the card shall set the WP_VIOLATION bit.

b. Block Write (I) MultiMediaCard Mode

In the preferred embodiment, when the card is operating under the MultiMediaCard mode, the block write commands (i.e. CMDs 24 to 27) are similar in operation to the block read commands as discussed. For the block write commands, one or more blocks of data are transferred from the host to the card. In this preferred embodiment of the present invention, a CRC is appended to the end of each block by the host. Furthermore, a card supporting block write can always accept a block of data which length is defined by the WRITE_BL_LEN field. If the CRC check fails, the card will indicate the failure on the DAT line and the transferred data will be discarded and not written. Finally, all further transmitted blocks will be ignored by the card.

If the host uses partial blocks whose accumulated length is not block aligned and block misalignment is not allowed (i.e. CSD parameter WRITE_BLK_MISALIGN is not set), the card will signal a block misalignment error and abort the data writing before the beginning of the first misaligned block. The card will then set the ADDRESS_ERROR error bit in the status register. All further data transfer will be ignored, and the host will wait in the Receive-data-State for a stop command.

Similarly, the write operation will also be aborted if the host tries to write over a write protected area. In this case, however, the card will set the WP_VIOLATION bit in the CRC register.

(ii) Serial Peripheral Interface Mode

When the card is operating under the Serial Peripheral Interface mode, the system of the preferred embodiment is operated similar to the MultiMediaCard mode. For example, during the data write in the Serial Peripheral Interface mode, the system also supports the multi-block write operations. Thus, upon reception of a valid write command (CMD24 in the MultiMediaCard protocol), the card will respond with a response token and will wait for a data block to be sent from the host. The CRC suffix, block length and start address restrictions are (with the exception of the CSD parameter WRITE_BL_PARTIAL controlling the partial block write option) identical to the read operation.

After a data block has been received, the card will respond with a data-response token. If the data block has been received without errors, it will be programmed. As long as the card is busy programming, a continuous stream of busy tokens will be sent to the host (effectively holding the Data-Out line low).

Once the programming operation is completed, the host must check the results of the programming using the SEND_STATUS command (CMD13). Some errors (e.g. address out of range, write protect violation etc.) are detected during programming only. The only validation check performed on the data block and communicated to the host via the data-response token is the CRC.

While the card is busy, resetting the CS signal will not terminate the programming process. The card will release the DataOut line (tri-state) and continue with programming. If the card is reselected before the programming is finished, the DataOut line will be forced back to low and all commands will be rejected.

Resetting a card (using CMD0) will terminate any pending or active programming operation. This may destroy the data formats on the card. It is in the responsibility of the host to prevent it.

V. Erase and Write Protect Management

The erase and write protect management procedures in the Serial Peripheral Interface mode are identical to those of the MultiMediaCard mode. The detail erase and write protect management is discussed in the MultiMediaCard specification enclosed therein. Specifically, while the card is erasing or changing the write protection bits of the predefined sector list, it will be a busy state and hold the DataOut line low.

VI. Programming the CID and CSD Registers (I) MultiMediaCard Mode

When the card is operating under the MultiMediaCard mode, the process of programming the CID and CSD registers of the preferred embodiment of the present invention does not require a previous block length setting. In addition, the transferred data is CRC protected. If any of part of the CSD or CID register is already stored in the ROM, the portion of the register will not be overwritten.

However, in one embodiment of the present invention, the card will verify whether the ROM data is consistent with the data received. If the data received is inconsistent with the data stored in the ROM, the error will be reported to the host.

In some instances, a card may require long and unpredictable times to write a block of data. Therefore, after receiving a block of data and completing the CRC check, the card will begin writing and hold the DAT line low if its write buffer is full and unable to accept new data from a new WRITE_BLOCK command. While waiting for the data writing to complete, the host may simultaneously poll the status of the card with a SEND_STATUS command (i.e. CMD13) at any time using the CMD line. After receiving this command, the card will respond to the host request with its status using the CMD line. The status bit READY_FOR_DATA of the CRC register indicates whether the card can accept new data or whether the write process is still in progress. If the host desires to terminate the ongoing process of sending data to one card and begin transferring data to another card in the MultiMediaCard system, the host can deselect the card by issuing a CMD7 command (to select a different card). The newly selected card will displace the previous selected card and placed the deselected card into a disconnect state and release the DAT line without interrupting the write operation. However, the deselected card can be reselected again if needed. By reselecting the card, the reselected card will reactivate the busy indication by pulling DAT to low if the data writing is still in progress and the write buffer is unavailable.

(ii) Serial Peripheral Interface Mode

On the other hand, during the Serial Peripheral Interface mode, unlike the MultiMediaCard protocol (where the register contents is sent as a command response), reading the contents of the CSD and CID registers in the Serial Peripheral Interface mode is a simple read-block transaction. The card will respond with a standard response token followed by a data block of 16 bytes suffixed with a 16-bit CRC.

VII. Reset Sequence

In the preferred embodiment of the present invention, the system can be reset when the system is running either under the MultiMediaCard mode or the Serial Peripheral Interface mode.

In both the MultiMediaCard and the Serial Peripheral Interface modes, a pre-defined reset sequence is required for reset. After power on reset or CMD0 (software reset) the card enters an idle state. At this state, the only legal host command is CMD1 (SEND_OP_COND). In the MultiMediaCard mode, than OCR operand is needed for CMD1. In Serial Peripheral Interface mode, however, CMD1 has no operand.

The host must poll the card (by repeatedly sending CMD1) until the "in-idle-state" bit in the card response indicates (by being set to 0) that the card completed its initialization processes and is ready for the next command.

VIII. Error Conditions

In the Serial Peripheral Interface mode, the card will always respond to a command. The response indicates acceptance or rejection of the command. A command may be rejected if it is not supported (illegal opcode), if the CRC check failed, if it contained an illegal operand, or if it was out of sequence during an erase sequence.

IX. Command Tokens

All the MultiMediaCard card commands are 6 bytes long. When the card is operating under the MultiMediaCard mode, the command transmission always starts with the left bit of the bitstream corresponding to the command codeword. All commands are protected by a CRC. The commands and arguments are listed in Table 36, It should be noted that the detail command formats of both MultiMediaCard and Serial Peripheral Interface should be referred to the specification, which is incorporated by reference in its entirety.

It is to be understood that while the invention has been described above in conjunction with preferred specific embodiments, the description and examples are intended to illustrate and not limit the scope of the invention, which is defined by the scope of the appended claims.

What is claimed is:

1. A memory card connectable to a master operating in a first communication protocol, comprising:
   an interface for connection to the master for the transfer of data and commands between the host and the memory card;

a memory section for storing said data; and an interface controller connected to the memory section and the interface, wherein the interface controller selects said first communication protocol from a plurality of protocols based solely on an initialization command received from the master upon connection to the master;

wherein the selection of the communication protocol is transparent to the master.

2. The memory card of claim 1, wherein the interface comprises a plurality of connection pins and wherein said initialization command comprises asserting a first signal level to a first connection pins when the host operates in the first protocol and not asserting said the first signal level to the first connection pins when the host does not operate in the first protocol.

3. The memory card of claim 2, wherein said asserting a first signal level is the assertion of a chip select signal and wherein the first protocol is a Serial Peripheral Interface protocol.

4. The memory card of claim 2, wherein the first protocol is a MultiMediaCard protocol.

5. A system comprising:

a host operating in a first communication protocol; and a first card connectable to the host for transferring data and commands between the first card and the host, wherein based on signals from the host the first card selects the first protocol from a plurality of protocols in a way transparent to the host upon connection to the host.

6. A system comprising:

a host that operates in a first communication protocol; and a first card connectable to the host for transferring data and commands between the first card and the host, wherein based on signals from the host the first card selects the first protocol from a plurality of protocols in a way transparent to the host, wherein the first card selects the first protocol in response to an initialization signal from the host when the first card is connected to the host.

7. The system of claim 6, wherein the first card comprises an interface through which the data and commands are transferred, the interface comprising a pin, and wherein the initialization signal comprises asserting a signal to said pin that is dependent upon said first protocol.

8. The system of claim 7, wherein said first protocol is a Serial Peripheral Interface protocol and said signal is a chip select signal.

9. The system of claim 7, wherein said first protocol is a MultiMediaCard protocol.

10. The system of claim 5, further comprising:

a second card connectable to the host simultaneously with the first card for transferring data and commands between the second card and the host, wherein the second card selects the first protocol from a plurality of protocols in a way transparent to the host upon connection to the host.

11. A method comprising:

connecting a first memory card capable of communicating in a plurality of communication protocols to a first host operating in a first of said plurality of communication protocols;

in response to said connecting the first memory card to the first host, transmitting an initialization command from the first host to the first card;

receiving the initialization command in the first card; and the first memory card selecting the first communication protocol for the transfer of data and commands between the first host and the first memory card based solely on the initialization command;

wherein the selection of the communication protocol is transparent to the host.

12. The method of claim 11, wherein said initialization command comprises asserting a chip select signal.

13. The method of claim 12, wherein the first card subsequently remains in said first protocol when the chip select signal is de-asserted.

14. The method of claim 12, wherein the first communication protocol is a Serial Peripheral Interface protocol.

15. The method of claim 11, wherein the first communication protocol is a MultiMediaCard protocol.

16. The method of claim 11, further comprising:

transferring first data from the first host to the first memory card using the first communication protocol;

disconnecting the first memory card from the first host;

connecting the first memory card to a second host operating in a second of said plurality of communication protocols;

in response to said connecting the first memory card to the second host, transmitting an initialization command from the second host to the first card;

receiving the initialization command from the second host in the first card;

the first memory card selecting the second communication protocol for the transfer of data and commands between the second host and the first memory card based solely on the initialization command from the second host; and transferring the first data from the first memory card to the second host using the second communication protocol.

17. The method of claim 11, further comprising:

connecting a second memory card capable of communicating in the plurality of communication protocols to the first host while the first memory card is also attached to the first host;

in response to said connecting the second memory card to the first host, transmitting an initialization command from the first host to the second card;

receiving the initialization command in the second card; and the second memory card selecting the first communication protocol for the transfer of data and commands between the first host and the second memory card based solely on the initialization command.

18. A method comprising:

connecting a memory card capable of communicating in a plurality of communication protocols to a host that can operate in at least one of said plurality of communication protocols for the transfer of data and commands between the host and the memory card;

in response to said connecting the first memory card to the first host, transmitting a first initialization command from the host to the card;

receiving the first initialization command in the card;

the card selecting the communication protocol in which the host is operating at the time of said transmitting the first initialization command based solely on the first initialization command;

during the continued operation of the host, subsequently transmitting a second initialization command from the host to the card;

receiving the second initialization command in the card; and the card selecting the communication protocol in which the host is operating at the time of said transmitting the second initialization command based solely on the second initialization command;

wherein the selection of the communication protocol is transparent to the host.

19. The memory card of claim 18, wherein said plurality of communication protocols includes at least a first and a second protocol, wherein the card is connected to the host by an interface comprising a plurality of connection pins, wherein said initialization commands comprises the simultaneous assertion of signal levels on the connection pins, and wherein the signals levels of the initialization of the first protocol differ from the signal levels of the initialization signal of the second protocol.

20. The memory card of claim 18, wherein said plurality of communication protocols include a Serial Peripheral Interface protocol.

21. The memory card of claim 18, wherein said plurality of communication protocols include a MultiMediaCard protocol.

22. A memory card electronically connectable to a master operating in a first operating protocol from among a plurality of protocols, comprising:

an interface comprising a plurality of terminals for connection to the master for the transfer of data between the host and the memory card;

a memory section for storing said data; and a controller connected to the memory section and the interface, wherein the controller automatically selects in a manner transparent to the master said first operating protocol based on one or more signals distributed among the plurality of terminals originating from the master at power up.

23. The memory card of claim 22, further comprising:

an interface driver, whereby said plurality of terminals are connected to the controller.

24. The memory card of claim 22, further comprising:

a memory core interface, whereby said memory section is connected to the controller.

25. The memory card of claim 22, wherein said memory section is a flash memory.

26. The memory card of claim 22, wherein said plurality of protocols includes a serial protocol.

27. The memory card of claim 22, wherein said plurality of protocols includes a protocol wherein said terminals include a bidirectional data channel between the card and the master.

28. A method of configuring a memory card capable of communicating in a plurality of protocols to operate with a host, comprising:

coupling the memory card to the host so that the host communicates with the memory card through a plurality of terminals, wherein the host is operating in a first of said plurality of protocols;

in response to said connecting the memory card to the host, powering up the memory card;

sensing in the card one or more signals originating from the host distributed among said plurality of terminals; and the memory card automatically selecting the first protocol for the transfer of data between the host and the memory card based on said signals originating from the host, wherein the selection of the protocol is transparent to the host.

29. The memory card of claim 28, wherein said plurality of protocols includes a serial protocol.

30. The memory card of claim 28, wherein said plurality of protocols includes a protocol wherein said terminals include a bidirectional data channel between the card and the master.

31. A system comprising:

a host operating in a first operating protocol from among a plurality of operating protocols;

a memory card;

an interface comprising a plurality of terminals for the connection of the memory card to the host for the transfer of data between the host and the memory card;

a memory section embedded within the memory card for storing said data; and a controller embedded within the memory card, wherein the controller automatically selects in a manner transparent to the master said first operating protocol based on one or more signals distributed among the plurality of terminals originating from the master at power up.

32. The system of claim 31, further comprising:

an interface driver embedded within the memory card, whereby said plurality of terminals are connected to the controller.

33. The system of claim 31, further comprising:

a memory core interface embedded within the memory card, whereby said memory section is connected to the controller.

34. The system of claim 31, wherein said memory section is a flash memory.

35. The system of claim 31, wherein said plurality of protocols includes a serial protocol.

36. The system of claim 31, wherein said plurality of protocols includes a protocol wherein said terminals include a bidirectional data channel between the card and the master.

* * * * *